(12) United States Patent  (10) Patent No.: US 7,903,021 B2
Aso et al.  (45) Date of Patent: Mar. 8, 2011

(54) OBSTACLE DETECTING METHOD, OBSTACLE DETECTING APPARATUS, AND STANDARD MOVING-BODY MODEL

(75) Inventors: Kazuaki Aso, Narashino (JP); Toshiki Kindo, Yokohama (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 12/083,219

(22) PCT Filed: Feb. 28, 2007

(86) PCT No.: PCT/JP2007/053761
§ 371 (c)(1),
(2), (4) Date: Apr. 7, 2008

(87) PCT Pub. No.: WO2007/100000
PCT Pub. Date: Sep. 7, 2007

(65) Prior Publication Data
US 2008/0266168 A1 Oct. 30, 2008

(30) Foreign Application Priority Data
Mar. 1, 2006 (JP) ................................. 2006-055440

(51) Int. Cl.
*G01S 13/00* (2006.01)
(52) U.S. Cl. ............................................ 342/70; 342/27
(58) Field of Classification Search ...................... 342/70
See application file for complete search history.

(56) References Cited

U.S. PATENT DOCUMENTS

| 2003/0135318 | A1* | 7/2003 | Tellis et al. ...................... 701/96 |
| 2004/0267452 | A1 | 12/2004 | Igarashi et al. |
| 2005/0128133 | A1* | 6/2005 | Samukawa et al. ............. 342/70 |
| 2005/0216171 | A1* | 9/2005 | Heinrichs-Bartscher ....... 701/96 |
| 2006/0193179 | A1* | 8/2006 | England et al. .......... 365/185.22 |

FOREIGN PATENT DOCUMENTS

| JP | A 09-249083 | | 9/1997 |
| JP | A 10-293178 | | 11/1998 |
| JP | 2001034898 A | * | 2/2001 |
| JP | A-2001-034898 | | 2/2001 |
| JP | A 2001-080437 | | 3/2001 |
| JP | A 2003-506785 | | 2/2003 |
| JP | A 2005-009914 | | 1/2005 |
| JP | A 2006-284293 | | 10/2006 |
| WO | WO 01/11388 A1 | | 2/2001 |

* cited by examiner

*Primary Examiner* — Thomas H Tarcza
*Assistant Examiner* — Timothy A Brainard
(74) *Attorney, Agent, or Firm* — Oliff & Berridge, PLC

(57) ABSTRACT

An obstacle detecting method for detecting a presence of an obstacle to a moving body using a sensor mounted on the moving body. The obstacle detecting method includes setting a movable area which is a surrounding area of the moving body and in which the moving body can move, arranging plural unconfirmed bodies over an entire area of the movable area as obstacle candidates as an initial state, and deleting the obstacle candidate which is determined not to be actually present as a result of detection by the sensor from the obstacle candidates arranged as the initial state.

28 Claims, 14 Drawing Sheets

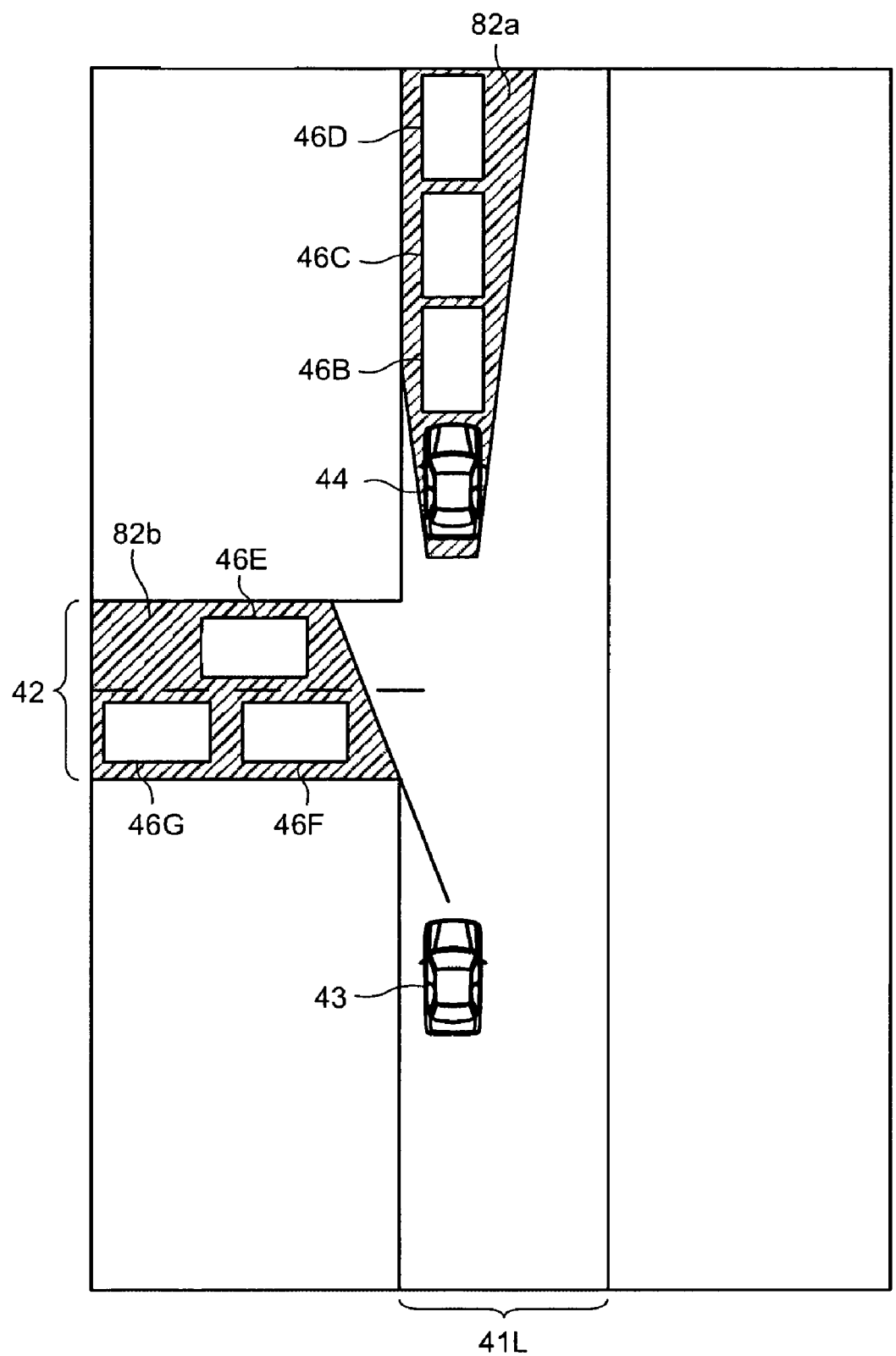

OBSTACLE DETECTING METHOD, OBSTACLE DETECTING APPARATUS, AND STANDARD MOVING-BODY MODEL

TECHNICAL FIELD

The present invention relates to an obstacle detecting method, an obstacle detecting apparatus, and a standard moving-body model suitable for applications in environmental prediction for realizing collision avoidance of automobiles, collision warning, automatic driving, and the like.

BACKGROUND ART

In general, for avoiding and warning in advance of the accidents of running automobiles, and for further realizing automatic driving, recognition of surrounding environment where obstacles such as other vehicles are present and prediction of behaviors of the obstacles are important. For this purpose, various obstacle detecting systems have been proposed. For example, Patent Document 1 discloses a technique for detecting whether an obstacle is present around an own vehicle or not using an in-vehicle sensor such as a radar-based sensor and utilizing the detection result for prediction for collision warning, collision avoidance, adaptive cruising control, and the like.
Patent Document 1: Published Japanese Translation of PCT International Application (Kohyo) No. 2003-506785

DISCLOSURE OF INVENTION

Problem to be Solved by the Invention

The system described in Patent Document 1, however, detects only those objects actually present as an obstacle based on the detection result of the in-vehicle sensor, and does not necessarily provide a clear solution to a question of how to deal with an obstacle that might be present in an area blocked from the detection of the in-vehicle sensor. To realize automatic driving in a place with many blocked areas, for example, in a small alley surrounded by walls and fences, it is very important to make environmental recognition properly adjusted to a situation with blocked areas.

The present invention is made in view of the above, and an object of the present invention is to provide an obstacle detecting method, an obstacle detecting apparatus, and a standard moving-body model which can properly deal with a blocked area, even when the in-vehicle sensor cannot detect an obstacle in the blocked area.

Means for Solving Problem

To solve the problems as described above and to achieve an object, an obstacle detecting method according to the present invention is an obstacle detecting method for detecting a presence of an obstacle to a moving body using a sensor mounted on the moving body, and includes setting a movable area which is a surrounding area of the moving body and in which the moving body can move, arranging plural unconfirmed bodies over an entire area of the movable area as obstacle candidates as an initial state, and deleting the obstacle candidate which is determined not to be actually present as a result of detection by the sensor from the obstacle candidates arranged as the initial state.

Further, in the obstacle detecting method according to the present invention, in an aspect as described above, the deleting is performed in sequence from the obstacle candidate closer to the moving body.

Further, an obstacle detecting method according to the present invention, in an aspect of the present invention as described above, is an obstacle detecting method for detecting a presence of an obstacle to a moving body using a sensor mounted on the moving body, and includes setting a movable area which is a surrounding area of the moving body and in which the moving body can move, detecting an empty area which is a surrounding area of the moving body and in which the obstacle is not actually present according to a result of detection by the sensor, setting a complementary area which is an area other than the empty area in the movable area, and arranging an unconfirmed body as an obstacle candidate over an entire area of the complementary area.

Further, in the obstacle detecting method according to the present invention, in an aspect of the present invention as described above, the unconfirmed body arranged as the obstacle candidate has a characteristic of a moving-body model for prediction of a behavior of the unconfirmed body.

Further, in the obstacle detecting method according to the present invention, in an aspect of the present invention as described above, the moving-body model is a virtual standard moving-body model having a virtual characteristic which is an integration of characteristics of plural single-moving-body models having different characteristics.

Further, in the obstacle detecting method according to the present invention, in an aspect of the present invention as described above, one of the single-moving-body models is an automobile model for predicting a behavior of an automobile.

Further, in the obstacle detecting method according to the present invention, in an aspect of the present invention as described above, one of the single-moving-body models is a human model for predicting a behavior of a human.

Further, the obstacle detecting method according to the present invention, in an aspect of the present invention as described above, further includes replacing the obstacle candidate which is determined to be actually present based on a result of detection by the sensor from the arranged obstacle candidates with an actually present obstacle.

Further, a standard moving-body model according to the present invention is a standard moving-body model for predicting a behavior of a virtual unconfirmed moving body, having a virtual characteristic which is an integration of characteristics of plural single-moving-body models which have different characteristics and can be actually present as the moving body.

Further, in the standard moving-body model according to the present invention, in an aspect of the present invention as described above, one of the single-moving-body models is an automobile model for predicting a behavior of an automobile.

Further, in the standard moving-body model according to the present invention, in an aspect of the present invention as described above, one of the single-moving-body models is a human model for predicting a behavior of a human.

Further, an obstacle detecting apparatus according to the present invention is an obstacle detecting apparatus for detecting a presence of an obstacle to a moving body using a sensor mounted on the moving body, and includes an area setting unit that sets a movable area which is a surrounding area of the moving body and in which the moving body can move, an arranging unit that arranges plural unconfirmed bodies over an entire area of the movable area as obstacle candidates as an initial state, and a deleting unit that deletes the obstacle candidate which is determined not to be actually present as a result of detection by the sensor from the obstacle candidates arranged as the initial state.

Further, an obstacle detecting apparatus according to the present invention, in an aspect of the present invention as described above, is an obstacle detecting apparatus for detecting a presence of an obstacle to a moving body using a sensor mounted on the moving body, and includes an area setting unit that sets a movable area which is a surrounding area of the moving body and in which the moving body can move, an empty area detecting unit that detects an empty area which is a surrounding area of the moving body and in which the obstacle is not actually present according to a result of detection by the sensor, a complementary area setting unit that sets a complementary area which is an area other than the empty area in the movable area, and an arranging unit that arranges an unconfirmed body as an obstacle candidate over an entire area of the complementary area.

Further, in the obstacle detecting apparatus according to the present invention, in an aspect of the present invention as described above, the unconfirmed body arranged as the obstacle candidate has a characteristic of a moving-body model for prediction of a behavior.

Further, in the obstacle detecting apparatus according to the present invention, in an aspect of the present invention as described above, the moving-body model is a standard moving-body model having a virtual characteristic which is an integration of characteristics of plural single-moving-body models having different characteristics.

Further, in the obstacle detecting apparatus according to the present invention, in an aspect of the present invention as described above, one of the single-moving-body models is an automobile model for predicting a behavior of an automobile.

Further, in the obstacle detecting apparatus according to the present invention, in an aspect of the present invention as described above, one of the single-moving-body models is a human model for predicting a behavior of a human.

Further, the obstacle detecting apparatus according to the present invention, in an aspect of the present invention as described above, further includes a replacing unit that replaces the obstacle candidate which is determined to be actually present based on a result of detection by the sensor from the arranged obstacle candidates with an actually present obstacle.

Effect of the Invention

According to the obstacle detecting method and the obstacle detecting apparatus of the present invention, even when the sensor mounted on a moving body cannot perform detection of a blocked area in a movable area of the moving body, it is assumed that an obstacle can be present in the blocked area, and an unconfirmed body is virtually arranged in the blocked area as an obstacle candidate when it is assumed that an obstacle can be present, whereby the environmental prediction can be performed with the use of an obstacle candidate represented by the unconfirmed body, which contributes to the realization of safe automatic driving and the like.

Further, the standard moving-body model of the present invention serves for the prediction of a behavior of an unconfirmed, virtual, moving body and has a virtual characteristic obtained through an integration of different characteristics of plural single-moving-body models which can be actually present as moving bodies, whereby safety can be prioritized in the prediction and determination of a behavior of an unconfirmed, virtual, moving body, and the standard moving-body model can be applied suitably to prediction of a behavior of an obstacle candidate represented by an unconfirmed body, for example.

BRIEF DESCRIPTION OF DRAWINGS

FIG. 14 is an explanatory diagram of a result of arrangement where an unconfirmed body which is determined to be actually present is replaced with an actually present obstacle.

EXPLANATIONS OF LETTERS OR NUMERALS

Figure 1:
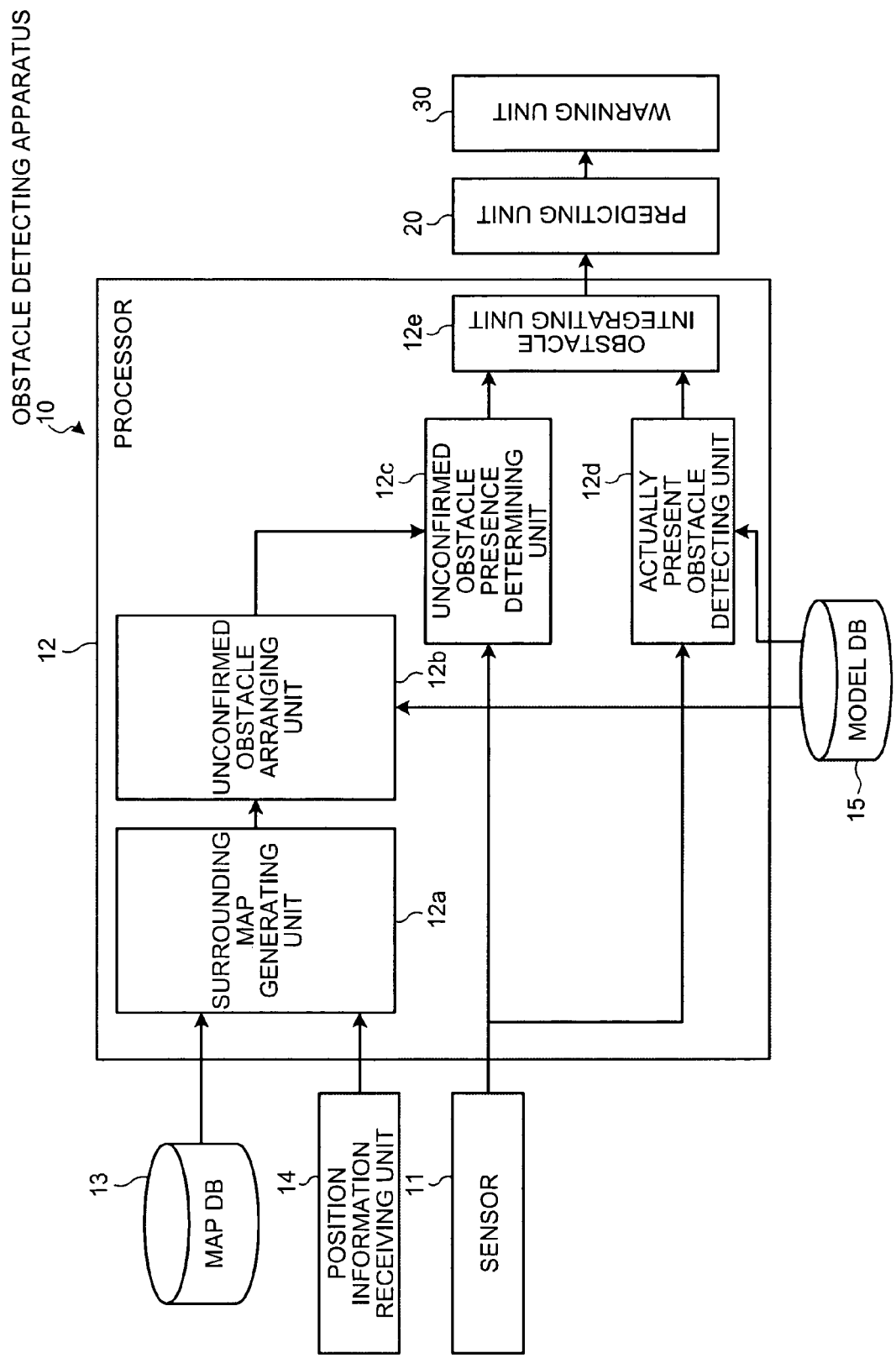
FIG. 1 is a schematic block diagram of an obstacle detecting apparatus according to a first embodiment of the present invention.

10 Obstacle detecting apparatus
11 Sensor
12a Surrounding map generating unit
12b Unconfirmed obstacle arranging unit
12c Unconfirmed obstacle presence determining unit
12d Actually present obstacle detecting unit
12e Obstacle integrating unit
41L Left-side lane
42 Open road
43 Own vehicle
44 Another vehicle
45 Screen
46 Unconfirmed body
47 Blocked area
50 Obstacle detecting apparatus
51 Sensor
52a Surrounding map generating unit
52b Empty area detecting unit 52c Complementary area calculating unit
52d Unconfirmed obstacle arranging unit
52e Actually present obstacle detecting unit
52f Obstacle integrating unit
81 Empty area
82a, 82b Complementary area

BEST MODE(S) FOR CARRYING OUT THE INVENTION

Exemplary embodiments of an obstacle detecting method, an obstacle detecting apparatus, and a standard moving-body model according to the present invention will be described in detail below with reference to the accompanying drawings. It should be noted, however, that the present invention is not limited by the embodiments and various modifications can be made to the embodiments without departing from the scope of the present invention.

First Embodiment

FIG. 1 is a schematic block diagram of an obstacle detecting apparatus according to a first embodiment of the present invention. The obstacle detecting apparatus serves to detect an obstacle which can obstruct the movement of an own vehicle which is an automobile running on a road and set as a target moving body. An obstacle detecting apparatus 10 of the first embodiment is mounted on the own vehicle and detects an obstacle, and includes a sensor 11, a processor 12, a map database (DB) 13, a position information receiving unit 14, and a model database (DB) 15. Result of detection by the obstacle detecting apparatus 10 is supplied to a predicting unit 20 which serves to predict a behavior of a detected obstacle, and a result of prediction of the predicting unit 20 is supplied to a warning unit 30 which gives a warning on obtaining a collision prediction.

The sensor 11 is mounted on the own vehicle at an appropriate position, for example, at a front position, and serves to detect whether an obstacle is present around the own vehicle or not. In the first embodiment, the sensor 11 is, for example, a millimeter-wave radar which can detect whether an obstacle is present or not in every direction by performing an electronic beam scanning.

The map DB 13 is a database storing therein map information such as information on national road map of Japan in an updatable manner, and any recording medium can be employed therefor, such as a compact disc (CD), a digital versatile disk (DVD), and a hard disk (HD). Further, the map DB 13 may be configured to obtain the map information via communication, for example, via the Internet and data broadcasting. The position information receiving unit 14 serves to receive information concerning a current position of the own vehicle, and, for example, is a GPS receiver of a Global Positioning Satellite (GPS) system utilizing a satellite. In brief, the map DB 13 and the position information receiving unit 14 can be implemented through the use of a car navigation system which has become remarkably widespread in recent years.

The model DB 15 is a database storing therein various types of moving-body models each having a specific behavioral characteristic for the prediction of a behavior of a moving body which can be an obstacle for the own vehicle. The moving-body models stored in the model DB 15 include, other than a standard moving-body model generated for the prediction of a behavior of an unconfirmed, virtual, moving body mentioned later, an automobile model for the prediction of a behavior of an automobile and a human model for the prediction of a behavior of a human, and further include a single-moving-body model such as a two-wheeled motor vehicle model and a bicycle model as necessary.

The processor 12 is configured as a micro computer including a central processing unit (CPU), a read only memory (ROM), a random access memory (RAM), and the like, and serves to implement an obstacle detecting method of the first embodiment. The processor 12 includes a surrounding map generating unit 12a, an unconfirmed obstacle arranging unit 12b, an unconfirmed obstacle presence determining unit 12c, an actually present obstacle detecting unit 12d, and an obstacle integrating unit 12e.

The surrounding map generating unit 12a generates a map of a surrounding area for identifying a surrounding area for which the presence/absence of an obstacle is determined by the obstacle detecting apparatus 10. Specifically, the surrounding map generating unit 12a generates a map around the own vehicle by referring to the map DB 13 using current-position information of the own vehicle received by the position information receiving unit 14. The range of the surrounding area may be set as appropriate, and preferably changes depending on the speed of the own vehicle so that an area covered by the surrounding area map expands as the speed increases. Further, the surrounding map generating unit 12a has a movable area setting function for recognizing a movable area, which is an area within the generated surrounding area map and in which the own vehicle can move, such as a left-side lane area and an open road area intersecting or merging with a vehicular road, based on map symbols and signs, and setting the movable area on the surrounding area map.

The unconfirmed obstacle arranging unit 12b serves to arrange plural unconfirmed bodies as obstacle candidates across the entire movable area of the own vehicle in the surrounding area map generated by the surrounding map generating unit 12a as an initial state. The unconfirmed obstacle arranging unit 12b allocates those having a characteristic of a moving-body model, more specifically, those having a characteristic of a standard moving-body model stored in the model DB 15 as the obstacle candidates represented by the unconfirmed bodies in the first embodiment.

The unconfirmed obstacle presence determining unit 12c serves to perform a deletion process on an obstacle candidate which is determined not to be actually present as a result of detection by the sensor 11 by applying the result of detection by the sensor 11 on the obstacle candidates arranged across the entire movable area by the unconfirmed obstacle arranging unit 12b. Therefore, in an output from the unconfirmed obstacle presence determining unit 12c, obstacle candidates other than those determined not to be actually present and deleted according to the result of detection by the sensor 11 remain in the movable area. Besides the actually present obstacles whose presence is detected by the sensor 11, those obstacle candidates arranged as the unconfirmed bodies in the initial state in a blocked area for which the obstacle detection by the sensor 11 cannot be performed remain in the movable area of the own vehicle.

The actually present obstacle detecting unit 12d serves to detect actually present obstacles in the movable area based on the result of detection by the sensor 11. The actually present obstacle detecting unit 12d has a function of identifying type of the actually present obstacle based on information such as difference in relative speed with the obstacle and a place of detection obtained as a result of detection by the sensor 11. Then, the actually present obstacle detecting unit 12d extracts a moving-body model corresponding to the type of the actually present obstacle from the model DB 15. For example, when an obstacle is detected on a vehicular road, the obstacle is identified as an automobile, and the automobile model is extracted from the model DB 15 and supplied to the obstacle integrating unit 12e.

The obstacle integrating unit 12e serves to perform a replacing process to replace the obstacle candidate whose actual presence is confirmed with an actually present obstacle by applying the result of detection by the actually present obstacle detecting unit 12d on the obstacle candidates as unconfirmed bodies arranged and remaining in the movable area in the output from the unconfirmed obstacle presence determining unit 12c. Hence, in the moving-body models supplied from the obstacle integrating unit 12e to the predicting unit 20, the standard moving-body model and other moving-body model such as an automobile model can be included. Further, the obstacle integrating unit 12e has a function of writing the obstacle candidate or the obstacle in a mode corresponding to the set moving-body model and converting together with the surrounding area map information into a BMP image, and supplying the resulting data to the predicting unit 20.

Figure 2:
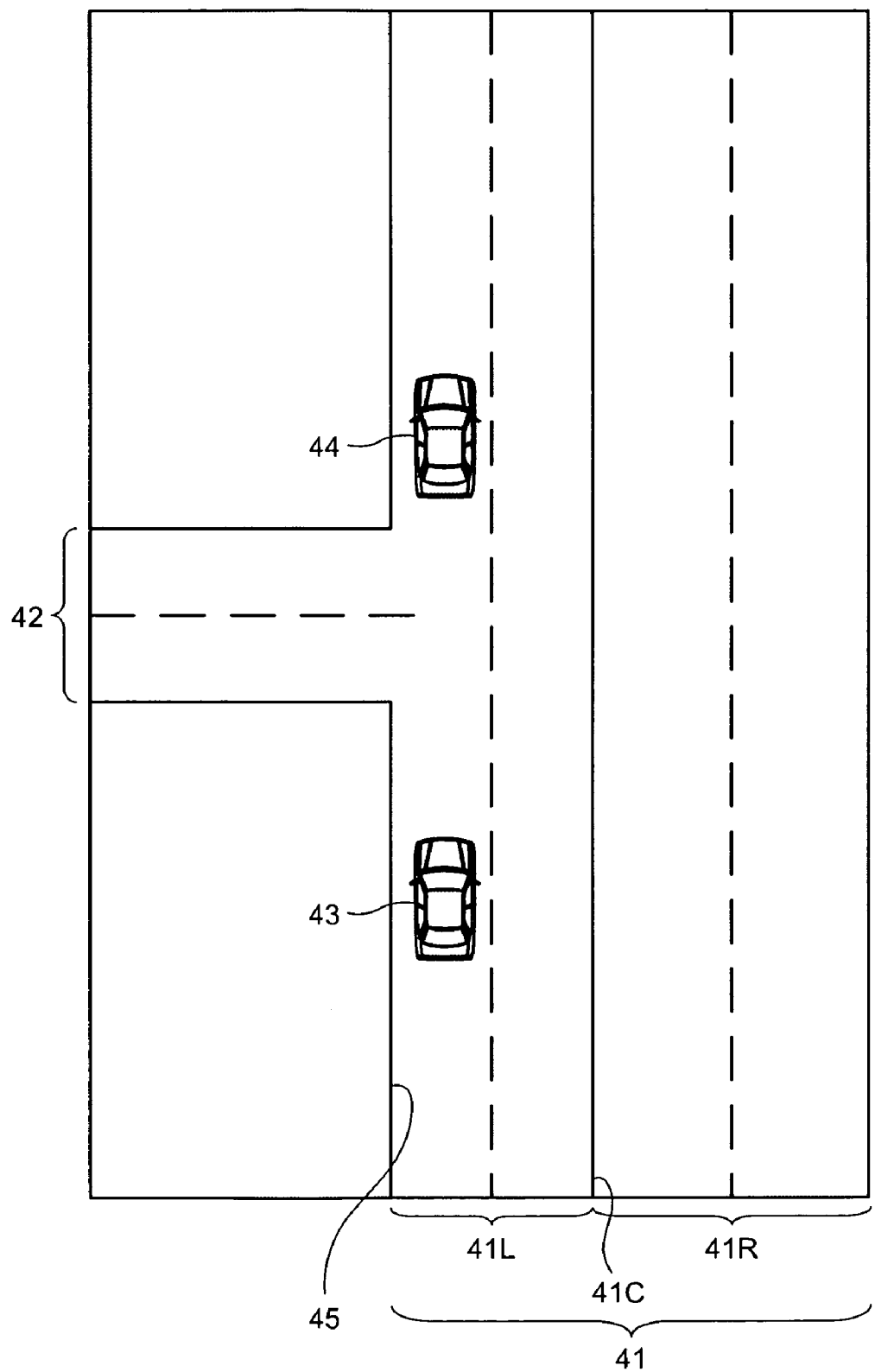
FIG. 2 is an explanatory diagram showing in a plan-view-like manner, an example of an actual situation in which an own vehicle can be placed.
Figure 3:
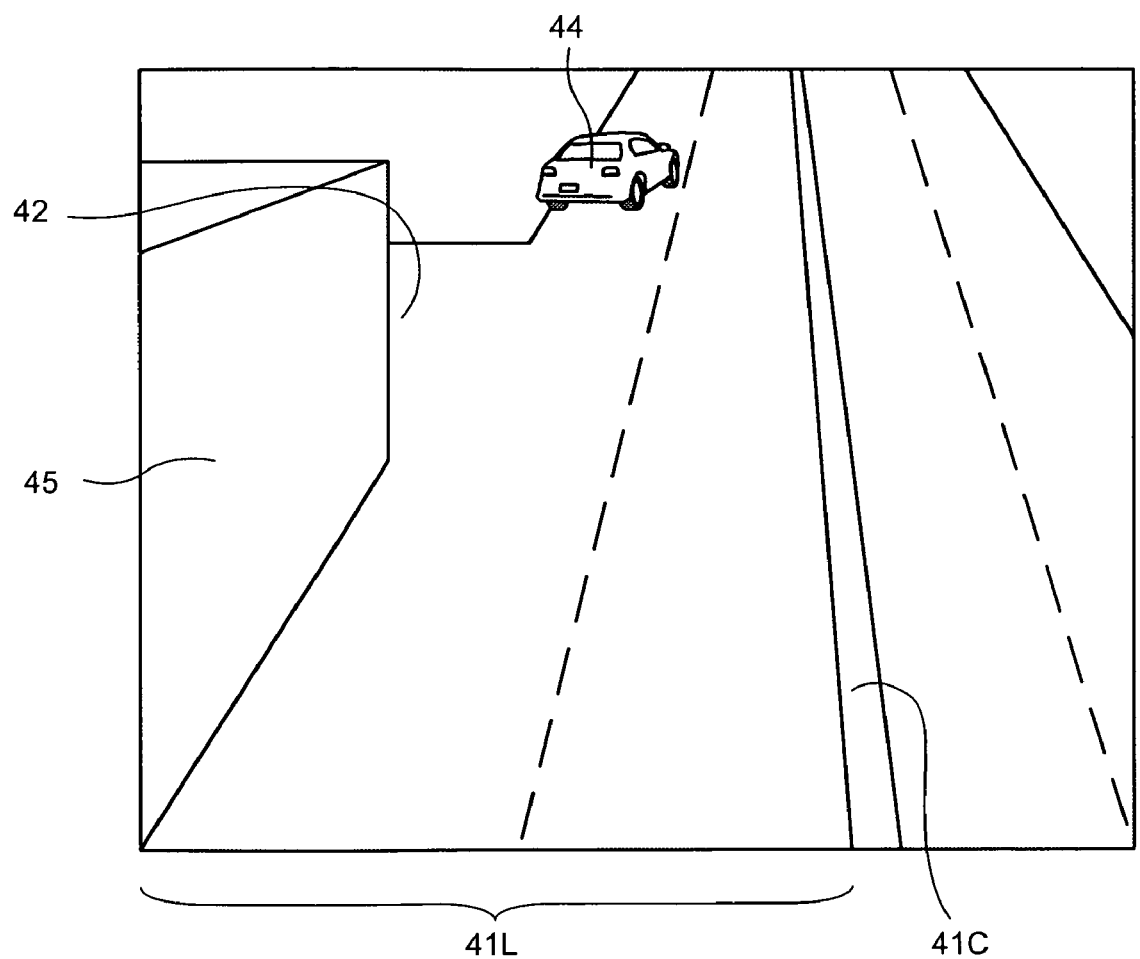
FIG. 3 is an explanatory diagram showing a frontal view from the own vehicle.

The obstacle detecting method of the first embodiment which is executed by the configuration as shown in FIG. 1 will be described with reference to a simple suppositious example. FIG. 2 is an explanatory diagram showing an example of an actual surrounding situation of the own vehicle in a planview-like manner, and FIG. 3 is an explanatory diagram showing a frontal view from the own vehicle. As shown in FIG. 2, assume that there is an automobile exclusive four-lane vehicular road 41 having two lanes for each way separated by a center divider 41C, and a two-lane open road 42 which is a side road intersecting with the four-lane vehicular road 41, for example. Further, assume that an own vehicle 43 is running on a left-side lane 41L and approaching the open road 42. In FIG. 2, reference character 44 denotes another actually present vehicle which is running on the left-side lane 41L ahead of the own vehicle 43. Further, assume that on the left side of the own vehicle 43 at the current position on the left-side lane 41L, a screen 45 such as a wall and a fence is present so as to obstruct the view of the open road 42 as shown in FIG. 3.

Figure 4:
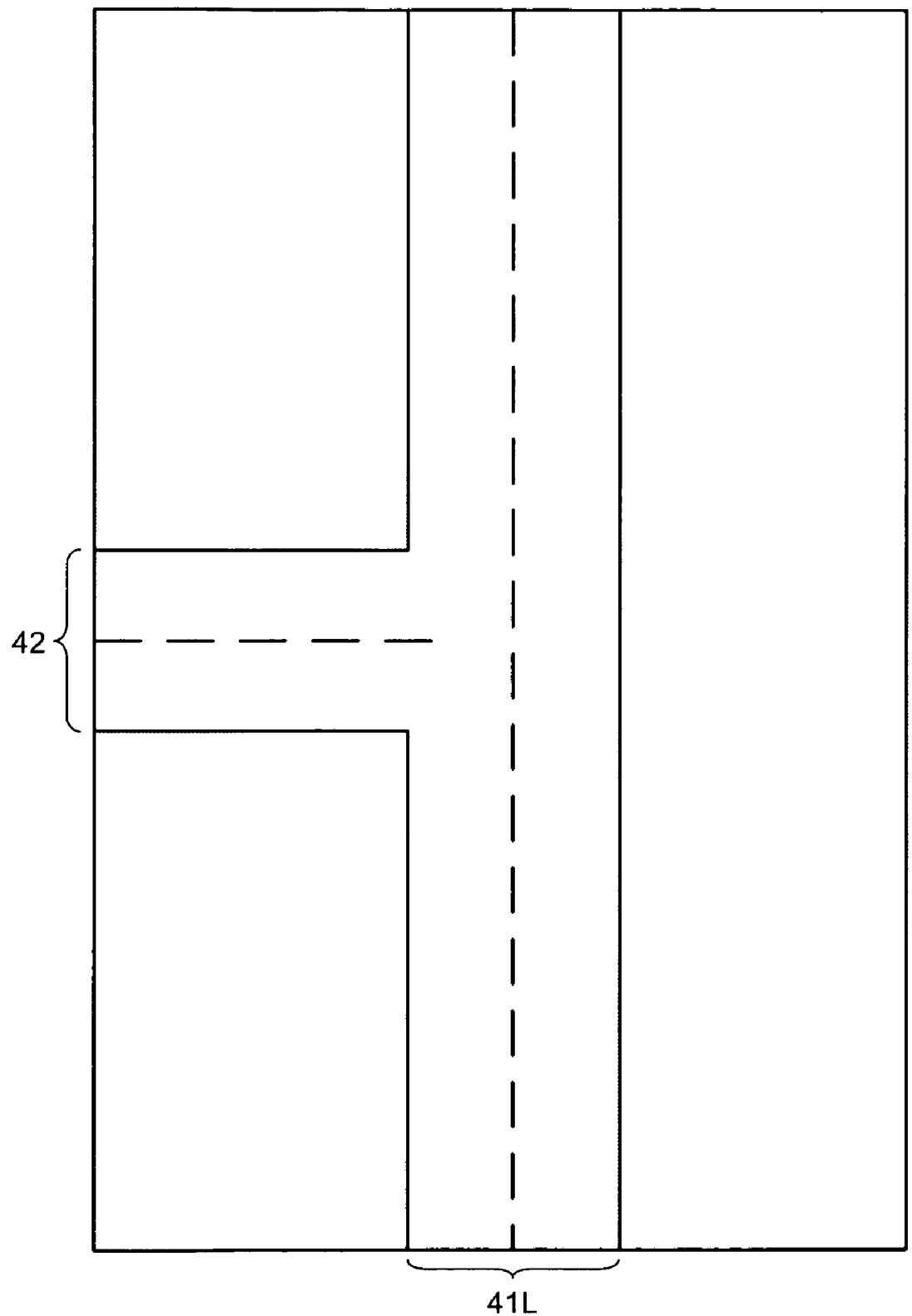
FIG. 4 is an explanatory diagram of an example of a map of a surrounding area generated by a surrounding map generating unit.

Firstly, based on map information received by the position information receiving unit 14, the surrounding map generating unit 12a recognizes a current position of the own vehicle 43 and generates a map of a surrounding area of the own vehicle 43 by referring to the map DB 13. FIG. 4 is an explanatory diagram of an example of a surrounding area map generated by the surrounding map generating unit 12a. Though the range of the surrounding area map here is set appropriately, the surrounding area map is a map putting an emphasis on a running automobile and on a forward advancing direction of the automobile relative to the current position.

The surrounding map generating unit 12a also recognizes an area where the own vehicle 43 can move in the future relative to the current position based on original map information, and sets only such area as a movable area in the generated surrounding area map. Specifically, in the situation as shown in FIG. 2, for example, the left-side lane 41L of the vehicular road 41 on which the own vehicle 43 is currently running and the open road 42 which intersects with the left-side lane 41L are set as the movable area of the own vehicle 43. Of the vehicular road 41, a lane 41R in the other way separated by the center divider 41C and areas other than the roads are excluded from the movable area of the own vehicle 43.

Figure 5:
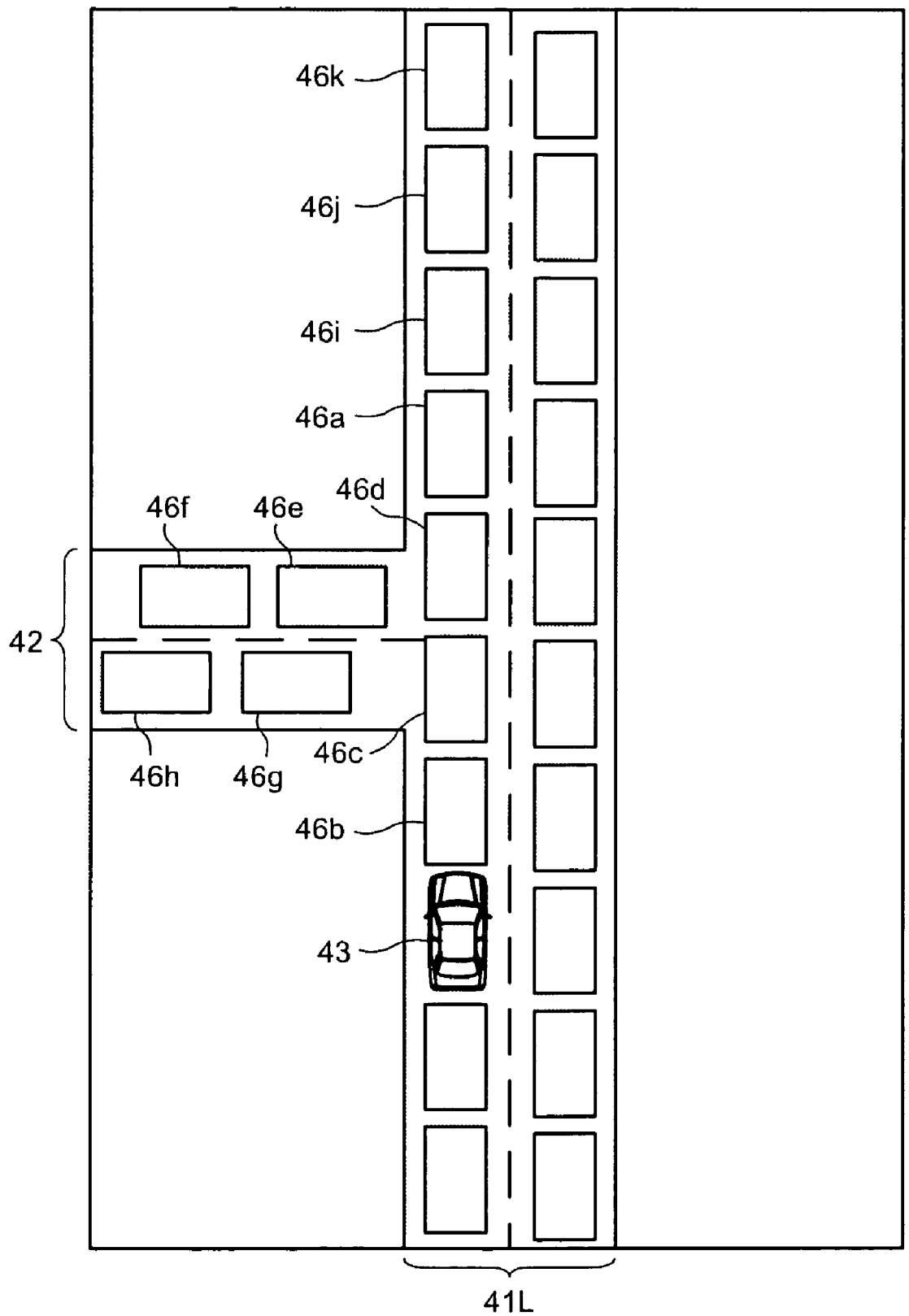
FIG. 5 is an explanatory diagram of an example of an initial state of an arrangement of plural unconfirmed bodies in movable areas.

The unconfirmed obstacle arranging unit 12b sets an initial state by arranging plural unconfirmed bodies 46 as obstacle candidates as shown in FIG. 5 over the entire movable area of the own vehicle 43 around the own vehicle 43 in the surrounding area map generated by the surrounding map generating unit 12a. FIG. 5 is an explanatory diagram of an example of the initial state of an arrangement of the plural unconfirmed bodies 46 in the movable area. As a moving-body model of the unconfirmed bodies 46, a standard moving-body model stored in the model DB 15 is adopted. Here, the other actually present vehicle 44 is also arranged as the unconfirmed body 46 of the standard moving-body model. In the example shown in FIG. 5, the unconfirmed bodies 46 are arranged so as to cover up the entire movable area at equal intervals. The arrangement is not limited to the example shown in FIG. 5, and the unconfirmed bodies 46 may be arranged overlapping with each other at shorter intervals, for example.

Figure 6:
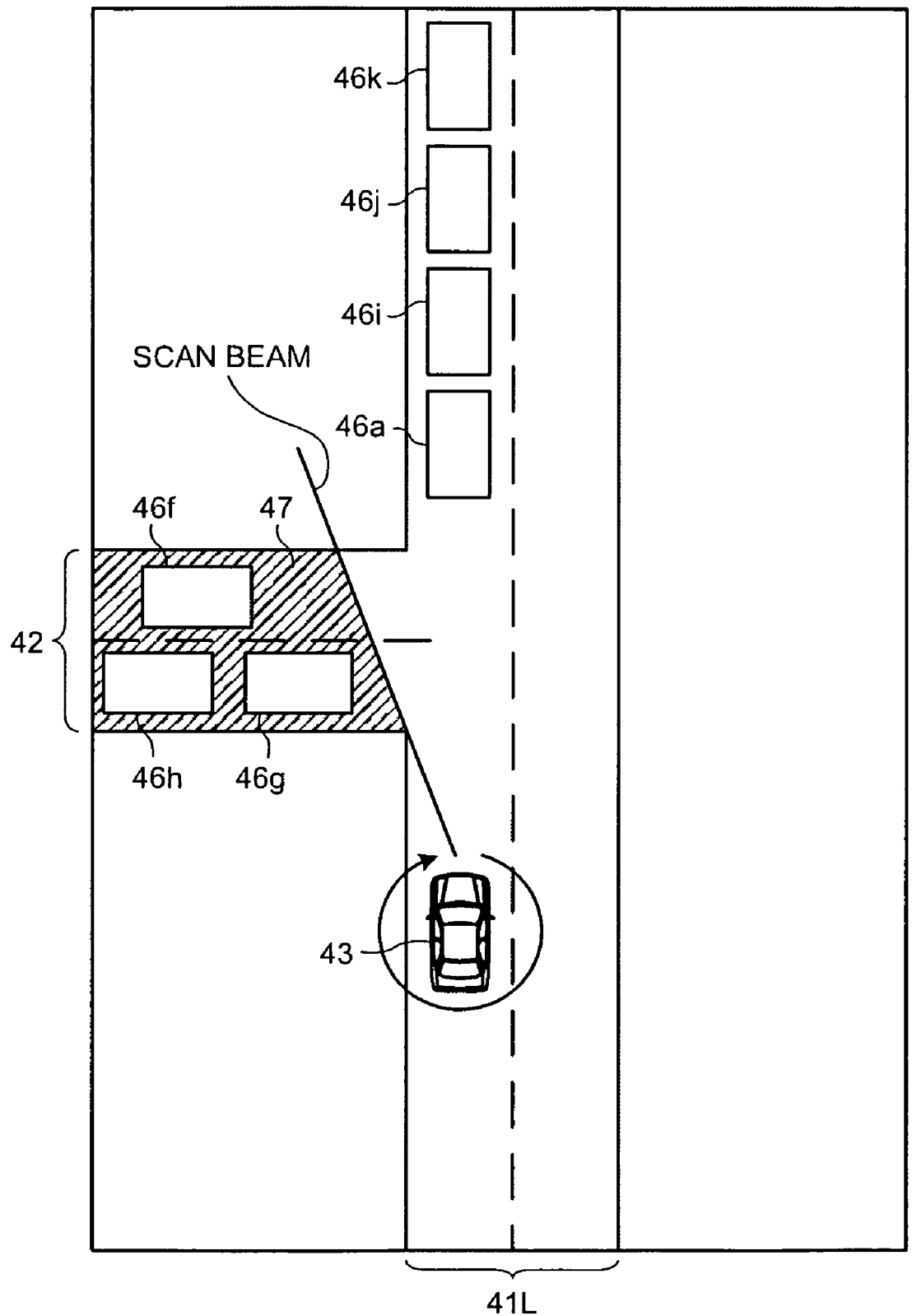
FIG. 6 is an explanatory diagram showing how a sensor performs a beam scan and a result of deletion of unconfirmed bodies determined not to be present as a result of the scan.

The unconfirmed obstacle presence determining unit 12c deletes the unconfirmed body 46 which is obviously not actually present among the plural unconfirmed bodies 46 arranged in the movable area by referring to the result of detection by the sensor 11. Specifically, the sensor 11 implemented as the millimeter-wave radar performs a detection operation in every direction for detecting whether the obstacle is present or not by performing an electronic beam scan from the current position of the own vehicle 43 starting from a place closer to the own vehicle 43. When the sensor 11 does not detect return beams over a certain distance therefrom within a scan area, the unconfirmed obstacle presence determining unit 12c can determine that the obstacle is not actually present in the area. FIG. 6 is an explanatory diagram showing how the sensor 11 performs a beam scan and a result of deletion of the unconfirmed bodies 46 which are determined not to be actually present as a result of the scan.

For example, even if the beam scanning is performed on an area between the own vehicle 43 and the other actually present vehicle 44 (unconfirmed body 46a) in the situation as shown in FIGS. 2 and 3, no return beam is received by the sensor 11. Then, the unconfirmed bodies 46b, 46c, and 46d are determined not to be actually present in this order and treated as objects of deletion. Similarly, no return beam is received by the sensor 11 when the beam scan is performed on an area of an adjacent lane in the left-side lane 41L and a rear area of the lane on which the own vehicle 43 is running. Therefore, the unconfirmed bodies 46 on the corresponding areas are determined not to be actually present and treated as objects of deletion. Further, with respect to the unconfirmed bodies 46 arranged on the open road 42, only the unconfirmed body 46e arranged at the top is determined not to be actually present and treated as an object of deletion since no return beam is received by the sensor 11 from an area corresponding to the unconfirmed object 46e. On the other hand, an area corresponding to the unconfirmed bodies 46f, 46g, and 46h is a blocked area 47 for which the scanning beam of the sensor 11 is blocked by the screen 45. Thus, the area is outside the range of beam scanning by the sensor 11, and the corresponding unconfirmed bodies cannot be determined not to be actually present based on the result of detection by the sensor 11 and are excluded from the objects of deletion. An area corresponding to unconfirmed bodies 46i, 46j, and 46k which are arranged at positions in front of the other vehicle 44 (unconfirmed body 46a) is treated in the same way.

As a result, in the output from the unconfirmed obstacle presence determining unit 12c, only the unconfirmed bodies 46a, 46f, 46g, 46h, 46i, 46j, and 46k including the other actually present vehicle 44 detected by the sensor 11 remain in the movable areas as shown in FIG. 6. In the first embodiment, the unconfirmed bodies 46f, 46g, and 46h are arranged as the obstacle candidates in the blocked area 47 for which the detection of the obstacle by the sensor 11 cannot be performed, more specifically, in a part of the open road 42 within the movable area of the own vehicle 43.

The predicting unit 20 can predict a possibility of collision and the like of the own vehicle 43 during driving by predicting a possible track based on the behaviors of the unconfirmed bodies 46a, 46f, 46g, 46h, 46i, 46j, and 46k that are arranged eventually in the movable areas of the own vehicle 43, and the behavior of the own vehicle 43 (such as a speed and a steering direction), for example. In particular, even when there is the blocked area 47 in the movable area, and detection by the sensor 11 mounted on the own vehicle 43 cannot be performed on the blocked area 47, it is assumed that there might be an obstacle in the blocked area 47, and when there can be an obstacle in the blocked area 47, the unconfirmed bodies 46f, 46g, and 46h are arranged virtually as the obstacle candidates in the blocked area 47. Thus, the environmental prediction for the own vehicle 43 can be performed with the use of the obstacle candidates as the unconfirmed bodies 46f, 46g, and 46h in the blocked area 47, which contributes to the realization of the safe automatic driving and the like.

In the example shown in FIG. 6, before the own vehicle 43 comes close to the open road 42, the own vehicle 43 is asked to be careful through a request for slow-driving, warning, and the like based on the prediction based on the assumed presence of the unconfirmed bodies 46f, 46g, and 46h. When the own vehicle 43 comes close to the open road 42 so that the open road 42 comes inside the detection range of the sensor 11 (in other words, so that the open road 42 is not the blocked area 47 any more), and it is determined that the unconfirmed bodies 46f, 46g, and 46h are not actually present, the process will continue based only on the unconfirmed bodies 46a, 46i, 46j, and 46k arranged on the same lane as targets of behavior prediction.

The moving-body model will be described. The moving-body model is adopted for the prediction of how the unconfirmed body 46 arranged as the obstacle candidate on the movable area will behave afterwards. When the danger of collision and the like of the own vehicle 43 is to be predicted, it is difficult to decide which moving-body model having what kind of behavioral characteristic is to be adopted for an unconfirmed virtual obstacle, in particular, for the unconfirmed body 46 arranged in the blocked area 47.

Figure 7A:
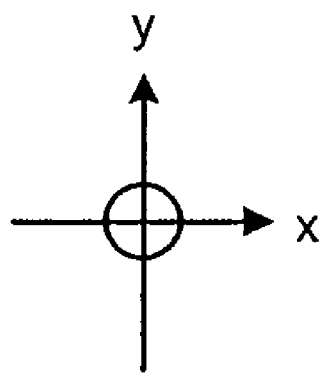
FIG. 7A is an explanatory diagram of a basic behavioral characteristic of a human model.
Figure 7B:
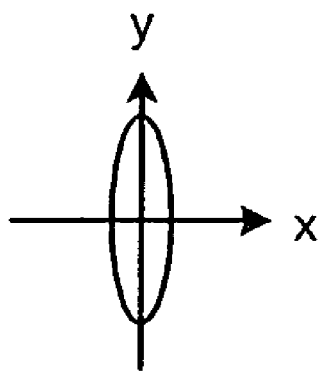
FIG. 7B is an explanatory diagram of a basic behavioral characteristic of an automobile model.

As an example, examine the behavioral characteristics of a human model and an automobile model which are single-moving-body models relating to an actually possibly present human and automobile as moving bodies at a time point t second after the current time point t=0 where the speed v is 0 km/h. Basically, the human model can move instantaneously in any four directions after the current time point t=0. Therefore, the behavioral characteristic of the human model can be represented as a circle on two-dimensional x-y coordinates as shown in FIG. 7A, which means that there is an equal possibility of presence in any directions. On the other hand, in the automobile model, the movement of the automobile after the current time point t=0 is restricted by the direction of the automobile (advancing direction of the automobile) at the current time point, and it is difficult for the automobile to move instantaneously in a lateral direction. On the two-dimensional x-y coordinates, the automobile model exhibits a behavioral characteristic represented by an elongated ellipse of FIG. 7B, which means that there is more possibility of presence in a particular direction (in this example, in the y-coordinate direction which represents the advancing direction).

In addition, when the time lapse is taken into consideration, the human model has such a behavioral characteristic that though it has a high instantaneous acceleration at the beginning of movement from the current time point t=0, it has a lower maximum speed thereafter. Hence, if the possible existence domain is schematically shown spatiotemporally over the time t from the current time point t=0, it, can be represented as portions (a) to (c) of FIG. 8. On the other hand, the automobile model has such a behavioral characteristic that though it has a low instantaneous acceleration at the beginning of movement from the current time point t=0, it has a higher maximum speed thereafter. Hence, if the possible existence domain is schematically shown spatiotemporally over time from the current time point t=0, it can be represented as portions (a) to (c) of FIG. 8. Further, the automobile model has a characteristic that it is larger than the human model in size.

Here, the unconfirmed body 46 which is arranged in the blocked area 47 and might be actually present can be an automobile, or a human (or a two-wheeled automatic vehicle, or a bicycle), for example. In order to treat the unconfirmed body 46 as an unconfirmed obstacle to the own vehicle 43 in the spatiotemporal environment while taking the time lapse into consideration, it is preferable, for ensuring the safety, to base the process on a moving-body model having a worst characteristic which is spatiotemporally most dispersible.

Figure 8:
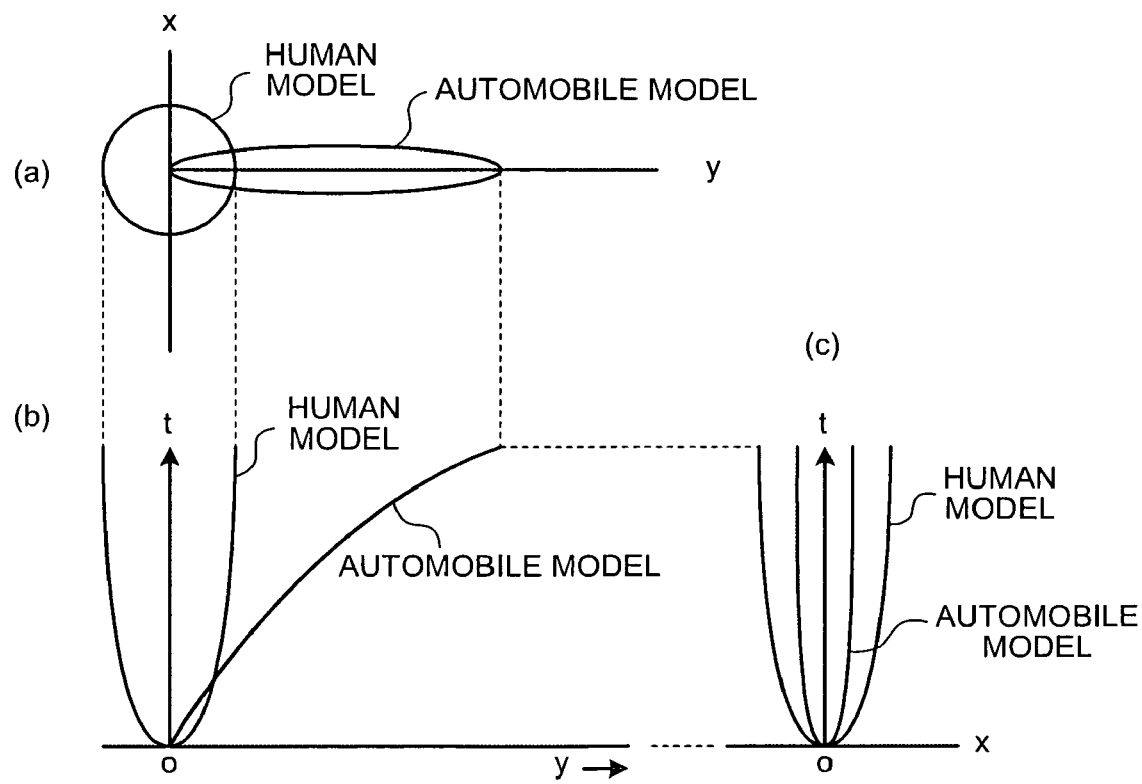
FIG. 8 is a schematic explanatory diagram spatiotemporally showing possible existence domains of the human model and the automobile model changing over time t from a current time point represented as t=0.

In the first embodiment, as a moving-body model employed for the prediction of a behavior of the unconfirmed body 47, a virtual standard moving-body model which has a virtual characteristic, such as a worst characteristic is adopted. The virtual standard moving-body model is an integration of behavioral characteristics of the human model and the automobile model which are single-moving-body models having different characteristics. The behavioral characteristic of the human model which can move in any direction rapidly and instantaneously as shown in the portions (a) to (c) of FIG. 8 and the behavioral characteristic of the automobile model which can move over a distance as shown in the portions (a) to (c) of FIG. 8 are regarded as the worst characteristics of respective single moving bodies, and the worst characteristics are integrated to create the virtual standard moving-body model having the worst integrated characteristic.

Figure 9:
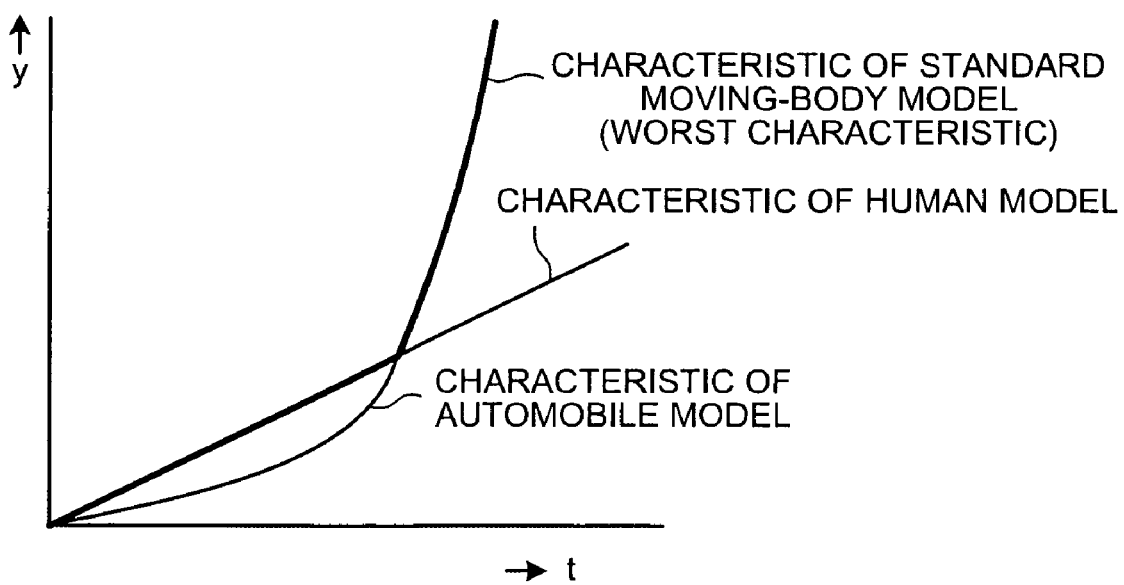
FIG. 9 is an explanatory diagram of an example of a worst characteristic of a time-movement amount of a newly created standard moving-body model in a y-coordinate direction.

FIG. 9 is an explanatory diagram of an example of a worst characteristic of time-movement amount relative to the y-coordinate direction of the newly created standard moving-body model. Specifically, the characteristic of the human model and the characteristic of the automobile model are considered and integrated as described above, so that the worst characteristic of the human model is adopted until a few seconds passes from the current time point t=0, and the worst characteristic of the automobile model is adopted thereafter. Further, since the own vehicle 43 is subjected to a larger and worse impact at the collision as the size of the model increases, the size of the automobile model is adopted as the size of the standard moving-body model. Therefore, the unconfirmed bodies 46 shown in FIGS. 5 and 6 are represented in the same size as the automobile model.

Thus, the virtual standard moving-body model having a virtual characteristic integrating different characteristics of plural single-moving-body models which can be actually present as the moving bodies, for example, the virtual standard moving-body model having the worst characteristic, is employed as the moving-body model for the prediction of the behavior of an unconfirmed virtual moving body such as the unconfirmed body 46. Therefore, in the prediction and determination of the behavior of the unconfirmed virtual moving body within a spatiotemporal environment, safety can be prioritized. Further, since the characteristic of the standard moving-body model is assumed to be possessed by all the unconfirmed bodies 46 arranged as the obstacle candidates, the prediction can be made based only on one type of a single-moving-body model. Thus, the computations are mostly the same or parallel, whereby a predicting calculation process can be simplified.

The standard moving-body model as described above is effective for the prediction of a behavior of an unconfirmed body which can be present in an unpredictable area in a traffic stream in general, and the utilization of the standard moving-body model contributes to proper operation of a traffic control system.

The actually present obstacle detecting unit 12d detects the actually present obstacle in the movable area of the own vehicle 43 based on the result of detection by the sensor 11. In the example as shown in FIGS. 2 and 3, the actually present obstacle detecting unit 12d detects the other preceding vehicle 44. The actually present obstacle detecting unit 12d, then identifies the obstacle as the automobile, extracts the automobile model from the model DB 15, and outputs the extracted model to the obstacle integrating unit 12e.

Figure 10:
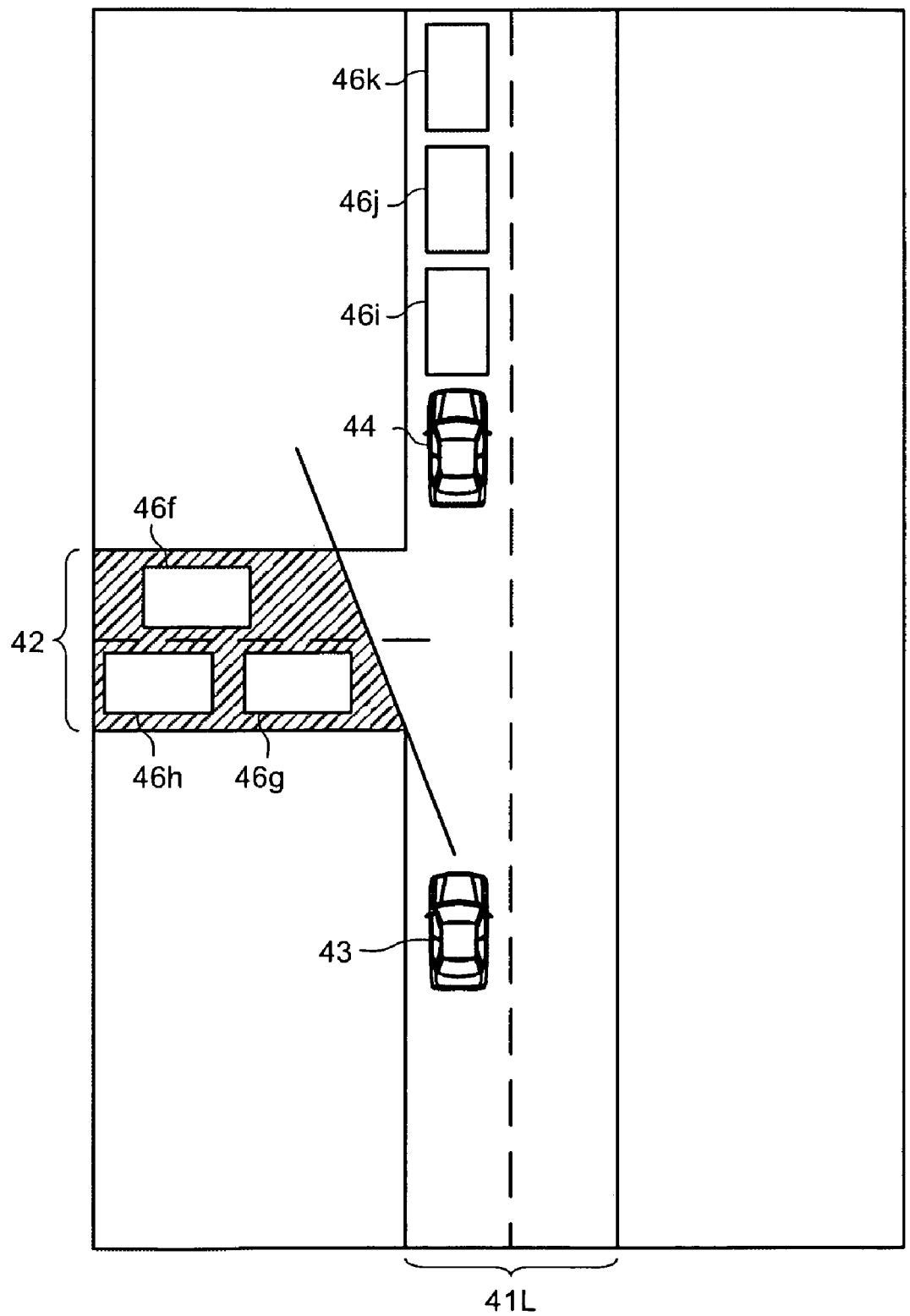
FIG. 10 is an explanatory diagram showing a result of arrangement where an unconfirmed body which is determined to be actually present is replaced with an actually present obstacle.

The obstacle integrating unit 12e applies the result of detection by the actually present obstacle detecting unit 12d to the obstacle candidates as the unconfirmed bodies 46 arranged and remaining in the movable area in the output from the unconfirmed obstacle presence determining unit 12c, and thereby performing a process to replace the obstacle candidate whose actual presence is confirmed among the arranged obstacle candidates with the actually present obstacle. In this example, as shown in FIG. 10, the unconfirmed body 46a is replaced with the actually present obstacle, i.e., the other vehicle 44 and the other vehicle 44 is arranged. The automobile model is applied to the other vehicle 44. When the obstacle is obvious to be actually present, a corresponding single-moving-body model is applied to the obstacle, and whereby estimation accuracy can be enhanced and more realistic and accurate predication can be realized.

Second Embodiment

Figure 11:
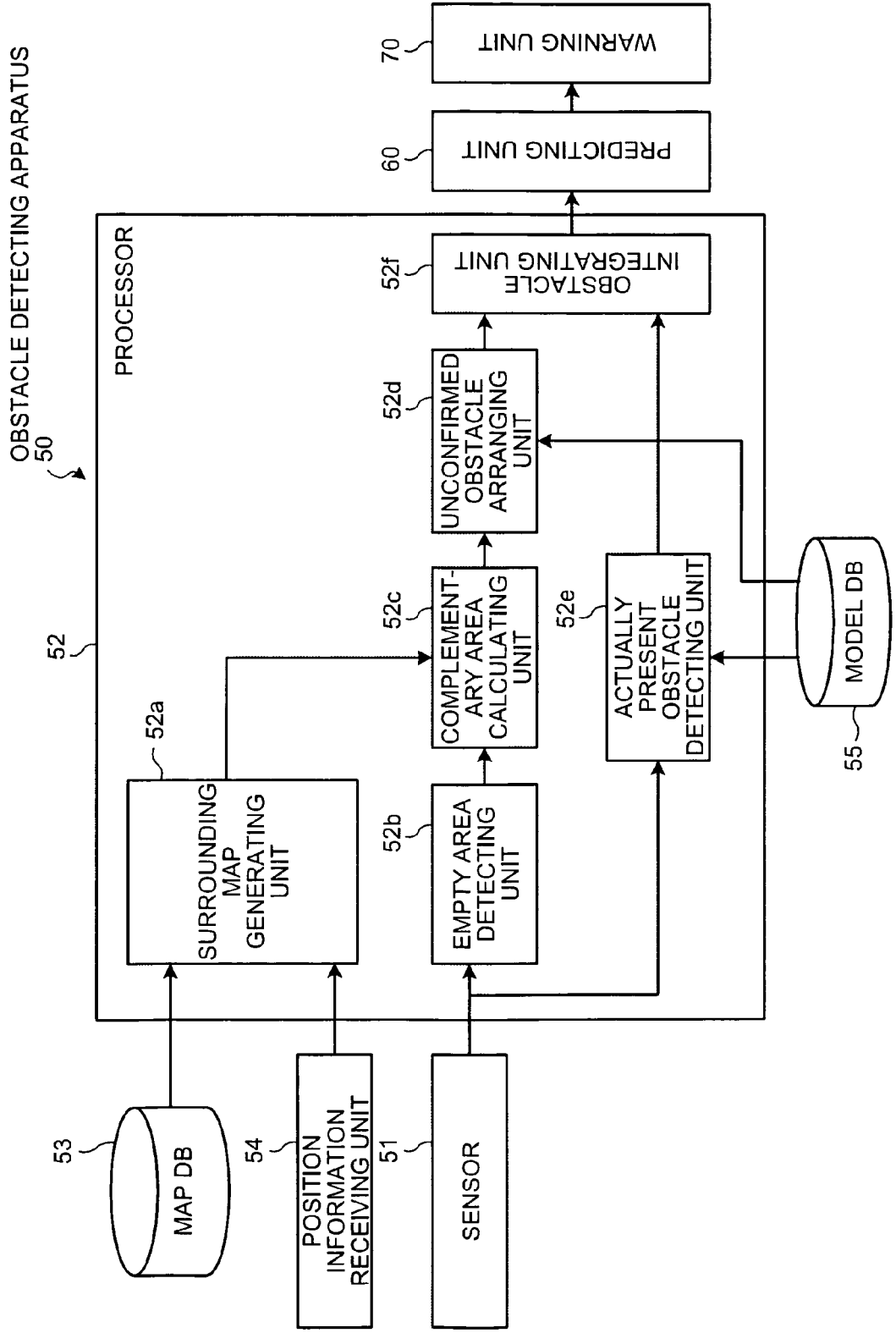
FIG. 11 is a schematic block diagram of an object detecting apparatus according to a second embodiment of the present invention.

FIG. 11 is a schematic block diagram of an obstacle detecting apparatus according to a second embodiment of the present invention. The obstacle detecting apparatus serves to detect an obstacle which can obstruct the movement of an own vehicle which is an automobile running on a road and set as a target moving body. An obstacle detecting apparatus 50 of the second embodiment is mounted on an own vehicle and detects an obstacle, and includes a sensor 51, a processor 52, a map database (DB) 53, a position information receiving unit 54, and a model database (DB) 55. Result of detection by the obstacle detecting apparatus 50 is supplied to a predicting unit 60 which serves to predict a behavior of a detected obstacle, and a result of prediction of the predicting unit 60 is supplied to a warning unit 70 which gives a warning on obtaining a collision prediction.

The sensor 51 is mounted on the own vehicle at an appropriate position, for example, at a front position, and serves to detect whether an obstacle is present around the own vehicle or not. In the second embodiment, the sensor 51 is, for example, a millimeter-wave radar which can detect whether an obstacle is present or not in every direction by performing an electronic beam scanning.

The map DB 53 is a database storing therein map information such as information on national road map of Japan in an updatable manner, and any recording medium can be employed therefor, such as a compact disc (CD), a digital versatile disk (DVD), and a hard disk (HD). Further, the map DB 53 may be configured to obtain the map information via communication, for example, via the Internet and data broadcasting. The position information receiving unit 54 serves to receive information concerning a current position of the own vehicle, and, for example, is a GPS receiver of a Global Positioning Satellite (GPS) system utilizing a satellite. In brief, the map DB 53 and the position information receiving unit 54 can be implemented through the use of a car navigation system which has become remarkably widespread in recent years.

The model DB 55 is a database storing therein various types of moving-body models each having a specific behavioral characteristic for the prediction of a behavior of a moving body which can be an obstacle for the own vehicle. The moving-body models stored in the model DB 55 include, other than a standard moving-body model generated for the prediction of a behavior of an unconfirmed, virtual, moving body (see the description of the first embodiment), an automobile model for the prediction of a behavior of an automobile and a human model for the prediction of a behavior of a human, and further include a single-moving-body model such as a two-wheeled motor vehicle model and a bicycle model as necessary.

The processor 52 is configured as a micro computer including a central processing unit (CPU), a read only memory (ROM), a random access memory (RAM), and the like, and serves to implement an obstacle detecting method of the second embodiment. The processor 52 includes a surrounding map generating unit 52a, an empty area detecting unit 52b, a complementary area calculating unit 52c, an unconfirmed obstacle arranging unit 52d, an actually present obstacle detecting unit 52e, and an obstacle integrating unit 52f.

The surrounding map generating unit 52a generates a map of a surrounding area for identifying a surrounding area for which the presence/absence of an obstacle is determined by the obstacle detecting apparatus 50. Specifically, the surrounding map generating unit 52a generates a map around the own vehicle by referring to the map DB 53 using current-position information of the own vehicle received by the position information receiving unit 54. The range of the surrounding area may be set as appropriate, and preferably changes depending on the speed of the own vehicle so that an area covered by the surrounding area map expands as the speed increases. Further, the surrounding map generating unit 52a has a function for recognizing a movable area, which is an area within the generated surrounding area map and in which the own vehicle can move, such as a left-side lane area and an open road area intersecting or merging with a vehicular road, based on map symbols and signs, and setting the movable area on the surrounding area map.

The empty area detecting unit 52b serves to detect an empty area, which is an area where an obstacle is not actually present according to the result of detection by the sensor 51 within the surrounding area map generated by the surrounding map generating unit 52a. An area from which no return beam corresponding to a scan beam emitted from the sensor 51 is received is detected as the empty area. The complementary area calculating unit 52c calculates a complementary area by removing the empty area detected by the empty area detecting unit 52b from the movable area in the surrounding area map generated by the surrounding map generating unit 52a. Here, "complementary area" means an area where an obstacle is actually present, or can be actually present in the movable area no matter whether it is a blocked area or not.

The unconfirmed obstacle arranging unit 52d serves to arrange unconfirmed bodies as obstacle candidates across the entire complementary area calculated and set by the complementary area calculating unit 52*c* in the surrounding area map generated by the surrounding map generating unit 52*a*. The unconfirmed obstacle arranging unit 52*d* allocates those having a characteristic of a moving-body model, more specifically, those having a characteristic of a standard moving-body model stored in the model DB 55 as the obstacle candidates represented by the unconfirmed bodies in the second embodiment.

The actually present obstacle detecting unit 52*e* serves to detect actually present obstacles in the movable area based on the result of detection by the sensor 51. The actually present obstacle detecting unit 52*e* has a function of identifying type of the actually present obstacle based on information such as difference in relative speed with the obstacle and a place of detection obtained as a result of detection by the sensor 51. Then, the actually present obstacle detecting unit 52*e* extracts a moving-body model corresponding to the type of the actually present obstacle from the model DB 55. For example, when an obstacle is detected on a vehicular road, the obstacle is identified as an automobile, and the automobile model is extracted from the model DB 55 and supplied to the obstacle integrating unit 52*f*.

The obstacle integrating unit 52*f* serves to perform a replacing process to replace the obstacle candidate whose actual presence is confirmed with an actually present obstacle by applying the result of detection by the actually present obstacle detecting unit 52*e* on the obstacle candidates as unconfirmed bodies arranged in the complementary area of the movable area obtained from the unconfirmed obstacle arranging unit 52*d*. Hence, in the moving-body models supplied from the obstacle integrating unit 52*f* to the predicting unit 60, the standard moving-body model and other moving-body model such as an automobile model can be included. Further, the obstacle integrating unit 52*f* has a function of writing the obstacle candidate or the obstacle in a mode corresponding to the set moving-body model and converting together with the surrounding area map information into a BMP image, and supplying the resulting data to the predicting unit 60.

The obstacle detecting method of the second embodiment which is executed by the configuration as shown in FIG. 11 will be described with reference to a simple suppositions example similar to that shown in FIGS. 2 and 3 with respect to the first embodiment.

Firstly, based on position information received by the position information receiving unit 54, the surrounding map generating unit 52*a* recognizes a current position of the own vehicle 43 and generates a map of a surrounding area of the own vehicle 43 by referring to the map DB 53. Further, the surrounding map generating unit 52*a* also recognizes an area where the own vehicle 43 can move in the future relative to the current position based on original map information, and sets only such area as a movable area as shown in FIG. 4 in the generated surrounding area map.

Figure 12:
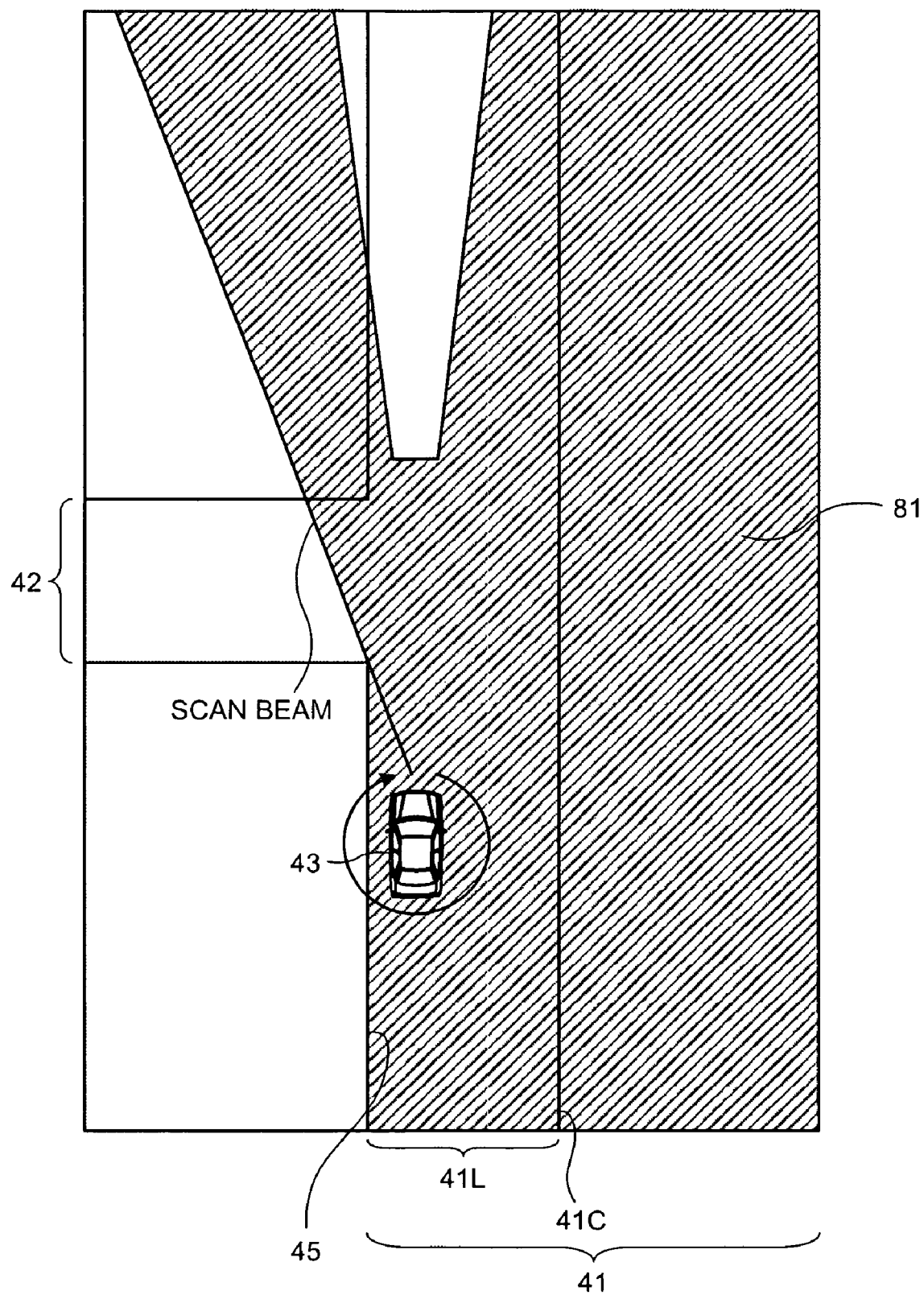
FIG. 12 is an explanatory diagram showing how a sensor performs a beam scan and an area which is determined to be an empty area as a result of the scan.

The empty area detecting unit 52*b* detects an empty area in which the obstacle is clearly not actually present according to the result of detection by the sensor 51 in the surrounding area map generated by the surrounding map generating unit 52*a* by referring to the result of detection by the sensor 51. Specifically, the sensor 51 implemented by a millimeter-wave radar performs a detection operation to detect whether the obstacle is present or not in every direction by performing an electronic beam scanning at the current position of the own vehicle 43. When no return beam is received for the scan beam over a certain area within a scanned area, this area is determined as an empty area where no obstacle is actually present. FIG. 12 is an explanatory diagram showing how the sensor 51 performs a beam scan in the situation as shown in FIGS. 2 and 3, and an area determined to be an empty area 81 (indicated by hatching) as a result of scanning.

Figure 13:
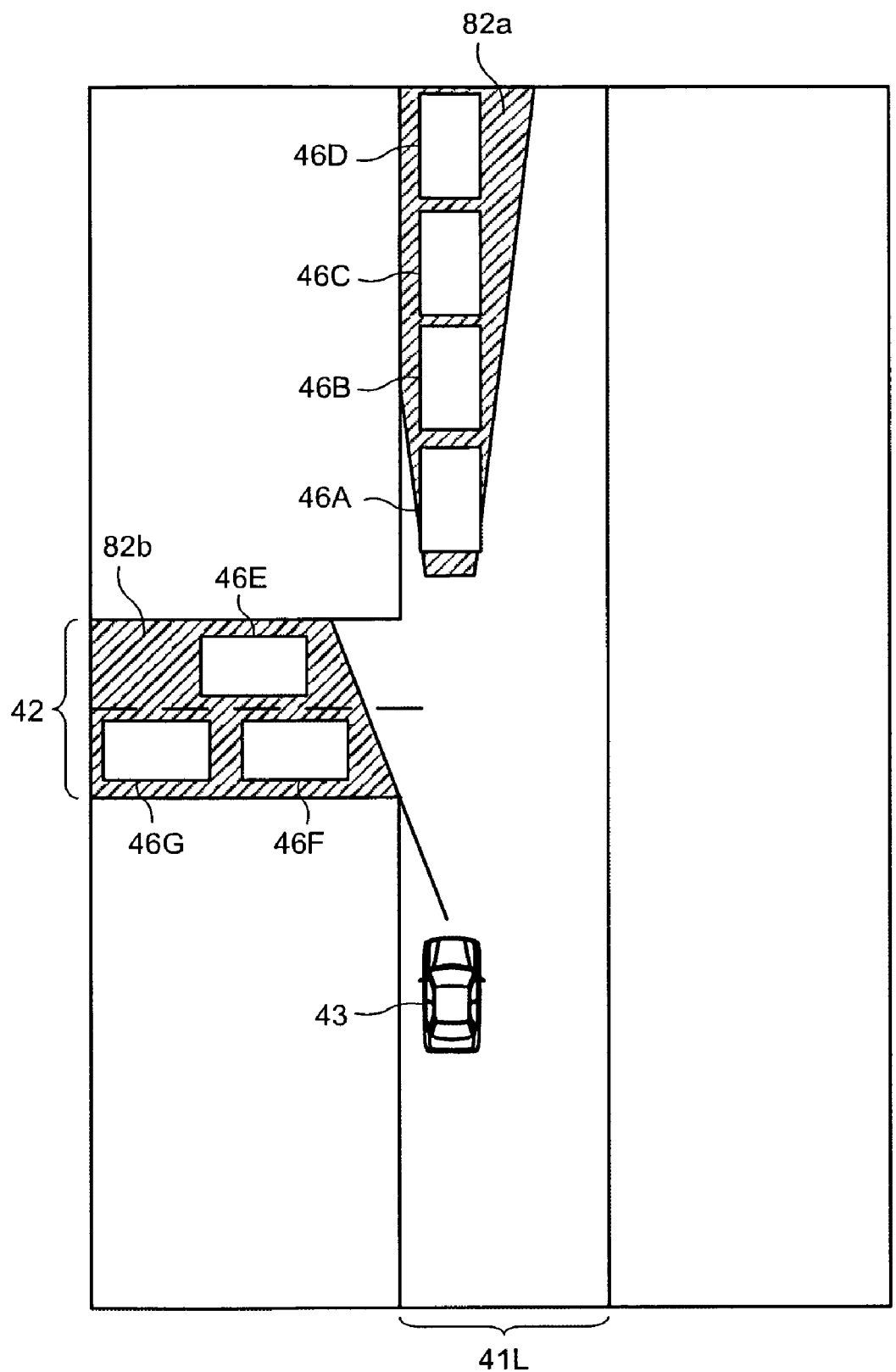
FIG. 13 is an explanatory diagram of an example of a calculated and set complementary area and an example of arrangement of unconfirmed bodies.

The complementary area calculating unit 52*c* calculates a complementary area by removing the empty area 81 detected by the empty area detecting unit 52*b* from the movable area (an area of the left-side lane 41L and an area of the open road 42) in the surrounding area map generated by the surrounding map generating unit 52*a*, and sets the calculated complementary area in the surrounding area map. FIG. 13 is an explanatory diagram showing an example of arrangement of the unconfirmed bodies 46 and examples of calculated and set complementary areas 82*a* and 82*b*. Of the two complementary areas 82*a* and 82*b*, the scan beam toward the complementary area 82*b* is blocked by the screen 45. Thus, the complementary area 82*b* is a blocked area for which the obstacle detection cannot be performed.

Plural unconfirmed bodies 46A to 46G are arranged as obstacle candidates over the entire calculated and set complementary areas 82*a* and 82*b* in the movable area as shown in FIG. 13. According to the second embodiment, the unconfirmed bodies 46E, 46F, and 46G are arranged as the obstacle candidates in a part of the open road 42, in other words, in the complementary area 82*b* corresponding to the blocked area in the movable area of the own vehicle 43 for which the obstacle detection cannot be performed. Here, a standard moving-body model stored in the model DB 55 is employed as a moving-body model for the unconfirmed bodies 46A to 46G. Here, the actually present other vehicle 44 is also arranged as the standard moving-body model corresponding to the unconfirmed body 46.

In the example shown in FIG. 13, the plural unconfirmed bodies 46 are arranged at equal intervals so as to cover up the entire complementary areas 82*a* and 82*b*. The present invention, however, is not limited to such an example, and the plural unconfirmed bodies 46 may be arranged so as to overlap with each other, or alternatively, one unconfirmed body 46 may be arranged for each of the complementary areas 82*a* and 82*b*. When one unconfirmed body is arranged for each, it is preferable, in particular, to arrange the unconfirmed body as the obstacle candidate at a position closest to a virtual boundary between the complementary areas 82*a* and 82*b* and the empty area 81 (in the example of FIG. 13, the unconfirmed bodies 46A and 46E are such bodies).

Hence, the predicting unit 60 can predict a possibility of collision and the like of the own vehicle 43 during driving by predicting the behaviors of the unconfirmed bodies 46A to 46G that are arranged in the complementary areas 82*a* and 82*b* of the movable area of the own vehicle 43. In particular, even when there is the complementary area 82*b* corresponding to the blocked area in the movable area, and detection by the sensor 51 mounted on the own vehicle 43 cannot be performed on the complementary area 82*b*, it is assumed that there might be an obstacle in the complementary area 82*b*, and when there can be an obstacle in the complementary area 82*b*, the unconfirmed bodies 46E to 46G are arranged virtually as the obstacle candidates in the complementary area 82*b*. Thus, the environmental prediction for the own vehicle 43 can be performed with the use of the obstacle candidates as the unconfirmed bodies 46A to 46G in the complementary area 82*b*, which contributes to the realization of the safe automatic driving and the like. The standard moving-body model is same with that described relative to the first embodiment.

The actually present obstacle detecting unit 52*e* detects the actually present obstacle in the movable area of the own vehicle 43 based on the result of detection by the sensor 51. In the example as shown in FIGS. 2 and 3, the actually present obstacle detecting unit 52e detects the other preceding vehicle 44. The actually present obstacle detecting unit 52e, then identifies the obstacle as the automobile, extracts the automobile model from the model DB 55, and outputs the extracted model to the obstacle integrating unit 52f.

The obstacle integrating unit 52f applies the result of detection by the actually present obstacle detecting unit 52e to the obstacle candidates as the unconfirmed bodies 46 arranged in the complementary areas 82a and 82b in the movable area obtained from the unconfirmed obstacle arranging unit 52d, and thereby performing a process to replace the obstacle candidate whose actual presence is confirmed among the arranged obstacle candidates with the actually present obstacle. In this example, as shown in FIG. 14, the unconfirmed body 46A is replaced with the actually present obstacle, i.e., the other vehicle 44 and the other vehicle 44 is arranged. The automobile model is applied to the other vehicle 44. When the obstacle is obvious to be actually present, a corresponding single-moving-body model is applied to the obstacle, whereby more realistic and accurate predication can be realized.

In the first and the second embodiments, the unconfirmed body 46 arranged as the obstacle candidate is assumed to have a characteristic of a standard moving-body model. However, the unconfirmed body may be assumed to have a characteristic of a single-moving-body model depending on the situation. For example, as on a highway, if a possibly present obstacle can be assumed to be an automobile, an unconfirmed body arranged as the obstacle candidate may be treated as having a characteristic of the automobile model from the beginning.

INDUSTRIAL APPLICABILITY

As can be seen from the foregoing, the obstacle detecting method, the obstacle detecting apparatus, and the standard moving-body model according to the present invention are useful for the collision avoidance, collision warning, and the like of the automobiles, and particularly suitable for the automatic driving of the automobiles.

The invention claimed is:

1. An obstacle detecting method for detecting a presence of an obstacle to a moving body using a sensor mounted on the moving body, comprising:
setting a movable area which is a surrounding area of the moving body and in which the moving body can move;
arranging plural unconfirmed bodies over an entire area of the movable area as obstacle candidates as an initial state; and
deleting the obstacle candidate which is determined not to be actually present as a result of detection by the sensor from the obstacle candidates arranged as the initial state.

2. The obstacle detecting method according to claim 1, wherein
the deleting is performed in sequence from the obstacle candidate closer to the moving body.

3. The obstacle detecting method according to claim 1, wherein
the unconfirmed body arranged as the obstacle candidate has a characteristic of a moving-body model for prediction of a behavior of the unconfirmed body.

4. The obstacle detecting method according to claim 3, wherein
the moving-body model is a virtual standard moving-body model having a virtual characteristic which is an integration of characteristics of plural single-moving-body models having different characteristics.

5. The obstacle detecting method according to claim 4, wherein
one of the single-moving-body models is an automobile model for predicting a behavior of an automobile.

6. The obstacle detecting method according to claim 4, wherein
one of the single-moving-body models is a human model for predicting a behavior of a human.

7. The obstacle detecting method according to claim 1, further comprising
replacing the obstacle candidate which is determined to be actually present based on a result of detection by the sensor from the arranged obstacle candidates with an actually present obstacle.

8. An obstacle detecting method for detecting a presence of an obstacle to a moving body using a sensor mounted on the moving body, comprising:
setting a movable area which is a surrounding area of the moving body and in which the moving body can move;
detecting an empty area which is a surrounding area of the moving body and in which the obstacle is not actually present according to a result of detection by the sensor;
setting a complementary area which is an area other than the empty area in the movable area; and
arranging an unconfirmed body as an obstacle candidate over an entire area of the complementary area.

9. The obstacle detecting method according to claim 8, wherein
the unconfirmed body arranged as the obstacle candidate has a characteristic of a moving-body model for prediction of a behavior of the unconfirmed body.

10. The obstacle detecting method according to claim 9, wherein
the moving-body model is a virtual standard moving-body model having a virtual characteristic which is an integration of characteristics of plural single-moving-body models having different characteristics.

11. The obstacle detecting method according to claim 10, wherein
one of the single-moving-body models is an automobile model for predicting a behavior of an automobile.

12. The obstacle detecting method according to claim 10, wherein
one of the single-moving-body models is a human model for predicting a behavior of a human.

13. The obstacle detecting method according to claim 8, further comprising
replacing the obstacle candidate which is determined to be actually present based on a result of detection by the sensor from the arranged obstacle candidates with an actually present obstacle.

14. A standard moving-body model for predicting a behavior of a virtual unconfirmed moving body, the virtual unconfirmed moving-body being produced by an obstacle integrating unit included in an obstacle detecting apparatus, the standard moving-body model having a virtual characteristic which is an integration of characteristics of plural single-moving-body models which have different characteristics and can be actually present as the moving body.

15. The standard moving-body model according to claim 14, wherein
one of the single-moving-body models is an automobile model for predicting a behavior of an automobile.

16. The standard moving-body model according to claim 14, wherein one of the single-moving-body models is a human model for predicting a behavior of a human.

17. An obstacle detecting apparatus for detecting a presence of an obstacle to a moving body using a sensor mounted on the moving body, comprising:
- an area setting unit that sets a movable area which is a surrounding area of the moving body and in which the moving body can move;
- an arranging unit that arranges plural unconfirmed bodies over an entire area of the movable area as obstacle candidates as an initial state; and
- a deleting unit that deletes the obstacle candidate which is determined not to be actually present as a result of detection by the sensor from the obstacle candidates arranged as the initial state.

18. The obstacle detecting apparatus according to claim 17, wherein
the unconfirmed body arranged as the obstacle candidate has a characteristic of a moving-body model for prediction of a behavior of the unconfirmed body.

19. The obstacle detecting apparatus according to claim 18, wherein
the moving-body model is a virtual standard moving-body model having a virtual characteristic which is an integration of characteristics of plural single-moving-body models having different characteristics.

20. The obstacle detecting apparatus according to claim 19, wherein
one of the single-moving-body models is an automobile model for predicting a behavior of an automobile.

21. The obstacle detecting apparatus according to claim 19, wherein
one of the single-moving-body models is a human model for predicting a behavior of a human.

22. The obstacle detecting apparatus according to claim 17, further comprising
a replacing unit that replaces the obstacle candidate which is determined to be actually present based on a result of detection by the sensor from the arranged obstacle candidates with an actually present obstacle.

23. An obstacle detecting apparatus for detecting a presence of an obstacle to a moving body using a sensor mounted on the moving body, comprising:
- an area setting unit that sets a movable area which is a surrounding area of the moving body and in which the moving body can move;
- an empty area detecting unit that detects an empty area which is a surrounding area of the moving body and in which the obstacle is not actually present according to a result of detection by the sensor;
- a complementary area setting unit that sets a complementary area which is an area other than the empty area in the movable area; and
- an arranging unit that arranges an unconfirmed body as an obstacle candidate over an entire area of the complementary area.

24. The obstacle detecting apparatus according to claim 23, wherein
the unconfirmed body arranged as the obstacle candidate has a characteristic of a moving-body model for prediction of a behavior of the unconfirmed body.

25. The obstacle detecting apparatus according to claim 24, wherein
the moving-body model is a virtual standard moving-body model having a virtual characteristic which is an integration of characteristics of plural single-moving-body models having different characteristics.

26. The obstacle detecting apparatus according to claim 25, wherein
one of the single-moving-body models is an automobile model for predicting a behavior of an automobile.

27. The obstacle detecting apparatus according to claim 25, wherein
one of the single-moving-body models is a human model for predicting a behavior of a human.

28. The obstacle detecting apparatus claim 23, further comprising
a replacing unit that replaces the obstacle candidate which is determined to be actually present based on a result of detection by the sensor from the arranged obstacle candidates with an actually present obstacle.

* * * * *